(12) United States Patent
Youn et al.

(10) Patent No.: US 12,232,191 B2
(45) Date of Patent: *Feb. 18, 2025

(54) SESSION MANAGEMENT METHOD

(71) Applicant: LG Electronics Inc., Seoul (KR)

(72) Inventors: Myungjune Youn, Seoul (KR); Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,692

(22) Filed: Sep. 11, 2023

(65) Prior Publication Data
US 2023/0422320 A1 Dec. 28, 2023

Related U.S. Application Data

(63) Continuation of application No. 18/108,321, filed on Feb. 10, 2023, now Pat. No. 11,800,576, which is a
(Continued)

(30) Foreign Application Priority Data

Aug. 12, 2020 (KR) ........................ 10-2020-0101242

(51) Int. Cl.
*H04W 48/18* (2009.01)
*H04W 76/10* (2018.01)
*H04W 92/02* (2009.01)

(52) U.S. Cl.
CPC ........... *H04W 76/10* (2018.02); *H04W 48/18* (2013.01); *H04W 92/02* (2013.01)

(58) Field of Classification Search
CPC ..... H04W 76/10; H04W 48/18; H04W 92/02; H04W 24/02; H04W 8/18; H04W 36/144;
(Continued)

(56) References Cited

U.S. PATENT DOCUMENTS 10,284,550 B2 * 5/2019 Suh ........................ H04W 12/35
2021/0144790 A1 * 5/2021 Faccin .................. H04W 60/00
(Continued)

OTHER PUBLICATIONS

3GPP TT 23.700-40 v0.4.0(Jun. 2020), 3rd Generation Partnership Project Technical Specification Group Services and System Aspects, Study on enhancement of network slicing phase 2 (Release 17), Jun. 2020, 148 pages.
(Continued)

*Primary Examiner* — Julio R Perez
(74) *Attorney, Agent, or Firm* — Fish & Richardson P.C.

(57) ABSTRACT

One disclosure of the present specification provides a method by which a network control node performs communication. The method comprises the steps of: determining whether to request, from a network function (NF), control for a network slice on the basis of a session, which is managed by a network control node, being related to an interworking procedure and on the basis of the network slice being controlled by a provider policy set in the network control node, the network slice being related to the session; transmitting a control request message for the network slice to the NF, on the basis of the determination that the network control node requests control for the network slice; and receiving a response message from the NF, wherein the response message includes information about whether the session is available in the network slice.

6 Claims, 12 Drawing Sheets

Related U.S. Application Data continuation of application No. PCT/KR2021/010675, filed on Aug. 11, 2021.

(58) Field of Classification Search
CPC ..... H04W 88/14; H04W 88/16; H04W 76/32; H04W 88/18
See application file for complete search history.

(56) References Cited

U.S. PATENT DOCUMENTS

| | | | | |
|---|---|---|---|---|
| 2021/0368421 | A1* | 11/2021 | Venkataraman | H04L 63/0892 |
| 2021/0377814 | A1* | 12/2021 | Sillanpaa | H04W 72/04 |
| 2021/0410059 | A1* | 12/2021 | Talebi Fard | H04L 69/24 |
| 2022/0132454 | A1* | 4/2022 | Youn | H04W 60/00 |
| 2022/0279392 | A1* | 9/2022 | Chen | H04W 48/18 |
| 2022/0312307 | A1* | 9/2022 | Koshta | H04W 60/04 |
| 2022/0338155 | A1* | 10/2022 | Ryu | H04W 76/10 |
| 2022/0377693 | A1* | 11/2022 | Sugawara | H04W 76/10 |
| 2023/0016724 | A1* | 1/2023 | Nayak | H04W 48/06 |

OTHER PUBLICATIONS

Ericsson, "Selecting the same PCF for AM and SM Policies when 5GS to EPS interworking," SA WG2 Meeting #S2-137E, S2-200xxxx, Feb. 24-27, 2020 Electronic meeting, 10 pages.

Office Action in Korean Appln. No. 10-2023-7004672, mailed on Oct. 31, 2023, 14 pages (with English translation).

* cited by examiner

SESSION MANAGEMENT METHOD

CROSS-REFERENCE TO RELATED APPLICATIONS

This application is a continuation of U.S. application Ser. No. 18/108,321, filed on Feb. 10, 2023, which is a continuation pursuant to 35 U.S.C. § 119(e) of International Application PCT/KR2021/010675, with an international filing date of Aug. 11, 2021, which claims the benefit of Korean Patent Application No. 10-2020-0101242, filed on Aug. 12, 2020, the contents of which are hereby incorporated by reference herein in their entirety.

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

It is necessary to manage whether network slices can be used for sessions related to interworking procedures.

SUMMARY

The network control node and the NF check the relevant policies to see if a particular session is available in the network slice.

The present specification may have various effects.

For example, through the procedure disclosed in this specification, efficient communication may be provided by taking into account operator policy for managing the number of sessions of a network slice according to various situations.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

DETAILED DESCRIPTION

Figure 1:
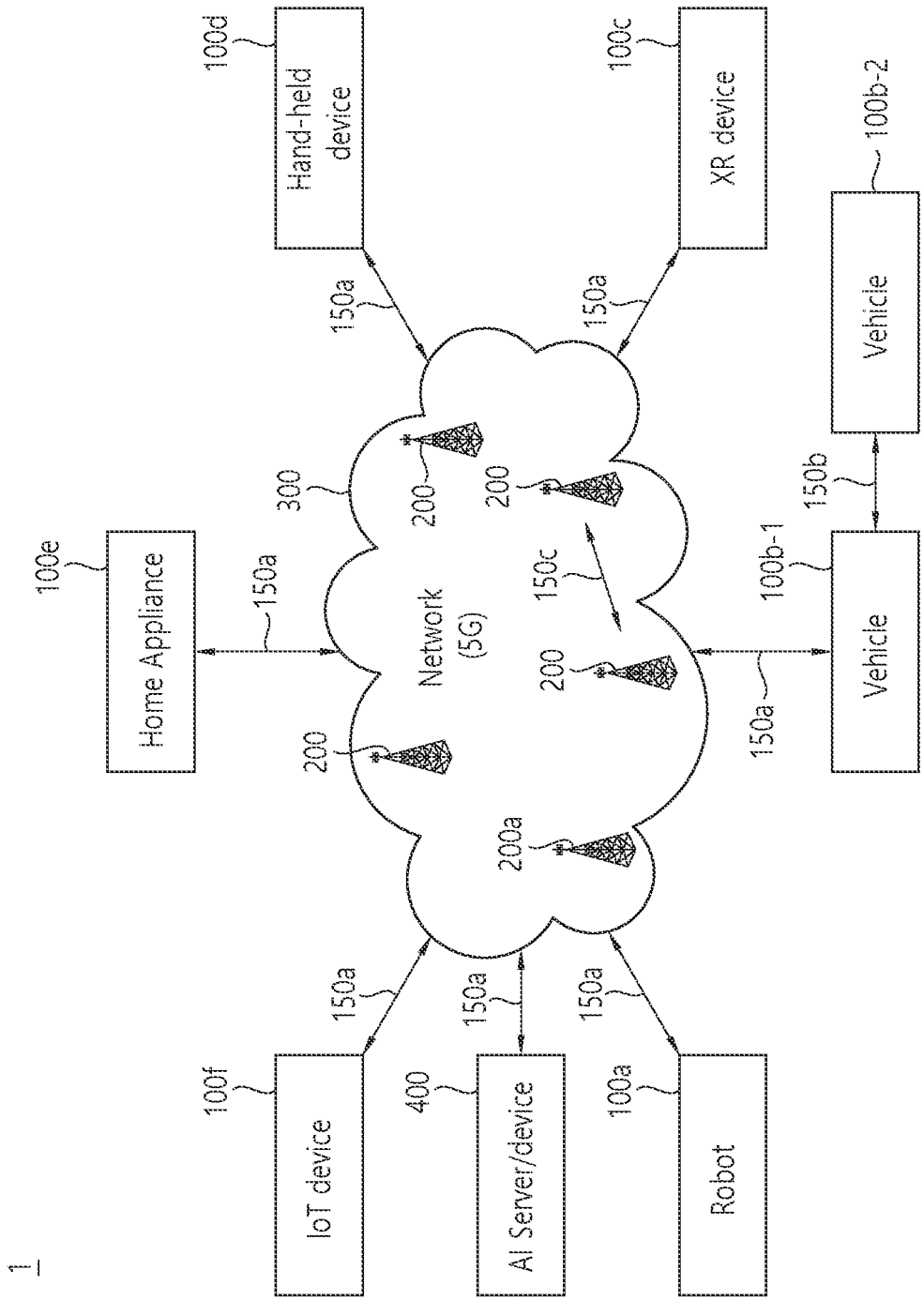
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHZ | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
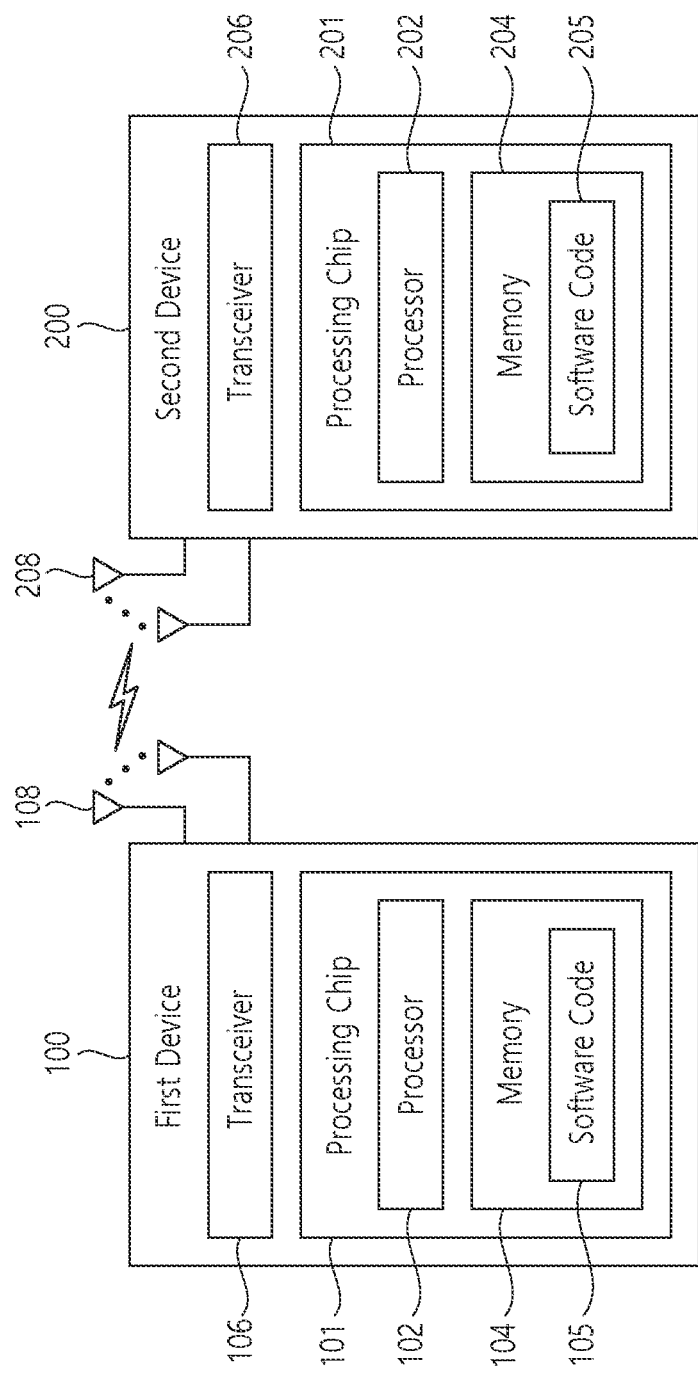
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
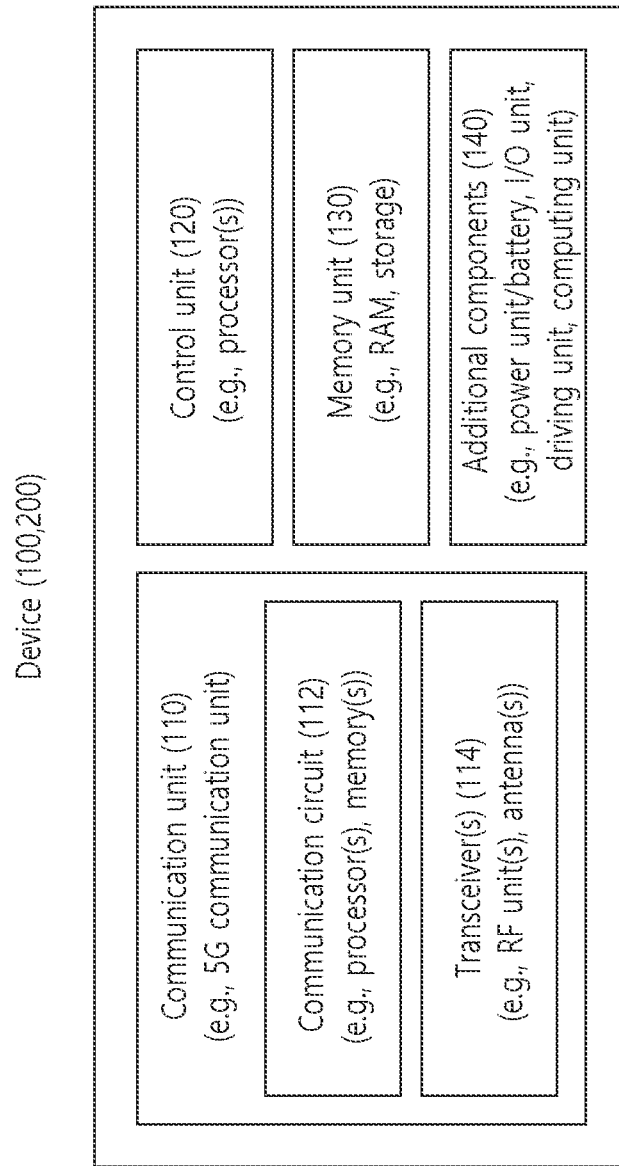
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
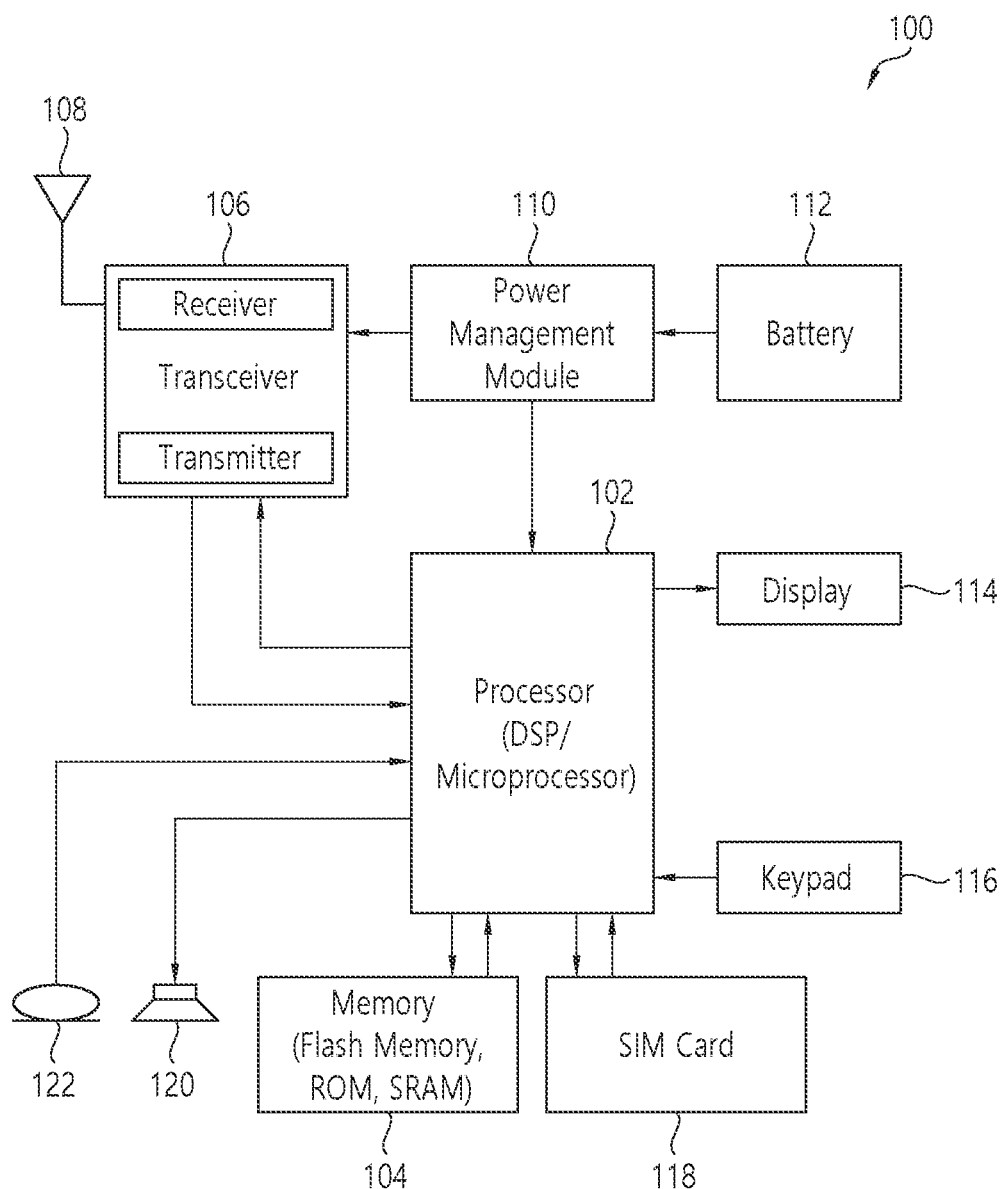
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
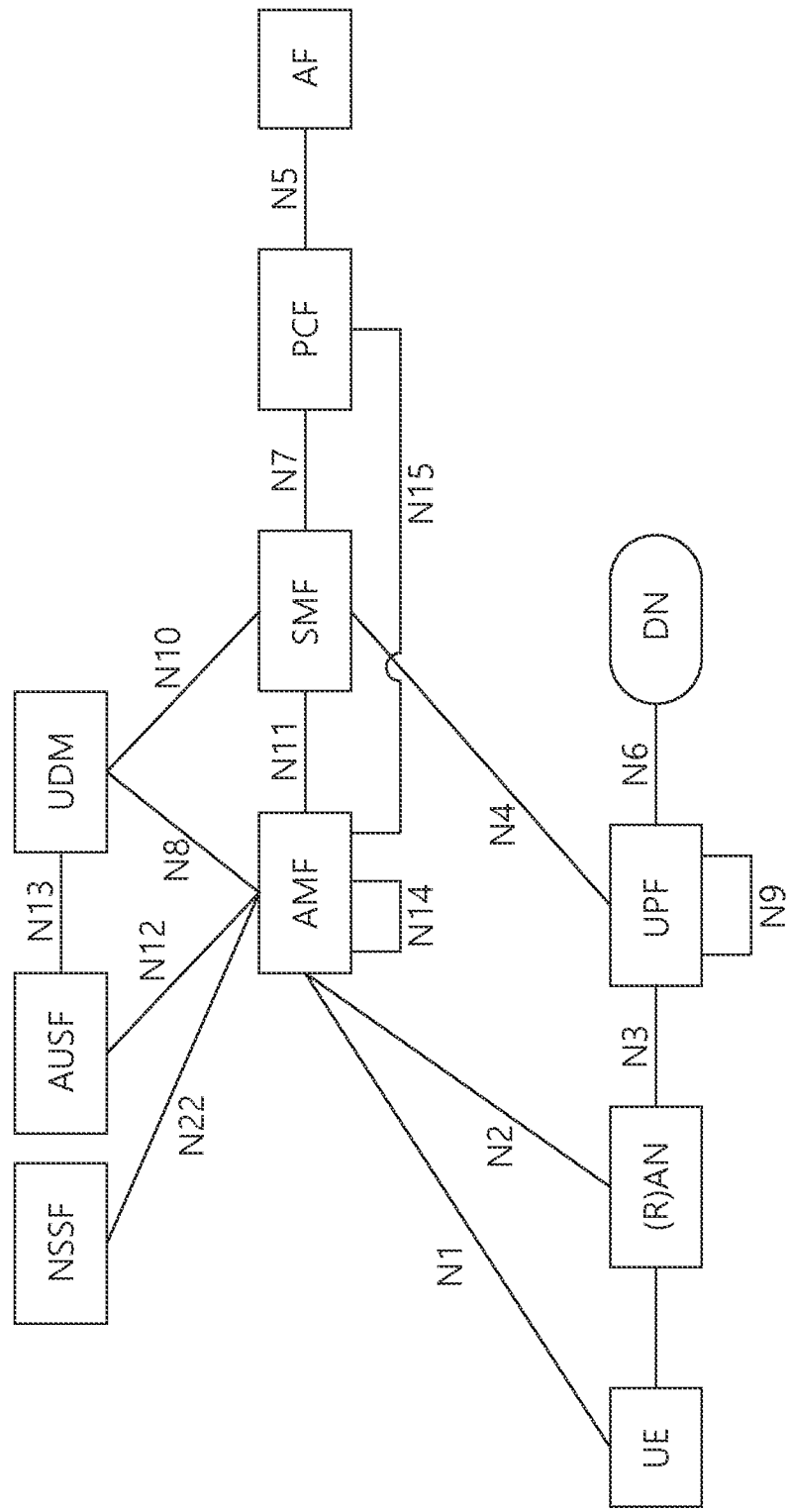
FIGS. 5 and 6 show examples of 5G system architectures to which implementations of the present specification are applied.
Figure 6:
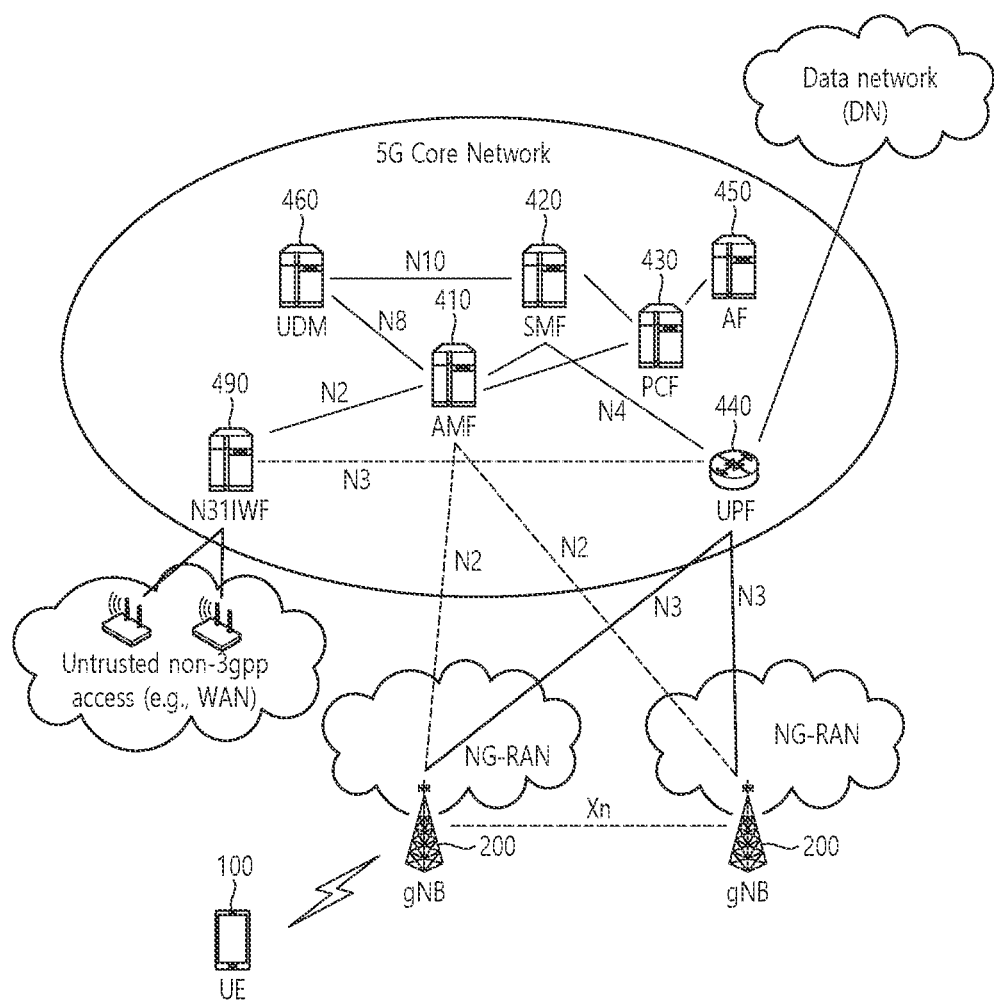

FIGS. 5 and 6 show examples of 5G system architectures to which implementations of the present specification are applied.

The 5G system (5GS; 5G system) structure consists of the following network functions (NFs).
 AUSF (Authentication Server Function)
 AMF (Access and Mobility Management Function)
 DN (Data Network), e.g., operator services, internet access or third-party services
 USDF (Unstructured Data Storage Function)
 NEF (Network Exposure Function)
 I-NEF (Intermediate NEF)
 NRF (Network Repository Function)
 NSSF (Network Slice Selection Function)
 PCF (Policy Control Function)
 SMF (Session Management Function)
 UDM (Unified Data Management)
 UDR (Unified Data Repository)
 UPF (User Plane Function)
 UCMF (UE radio Capability Management Function)
 AF (Application Function)
 UE (User Equipment)
 (R)AN ((Radio) Access Network)
 5G-EIR (5G-Equipment Identity Register)
 NWDAF (Network Data Analytics Function)
 CHF (Charging Function)
In addition, the following network functions may be considered.
 N3IWF (Non-3GPP InterWorking Function)
 TNGF (Trusted Non-3GPP Gateway Function)
 W-AGF (Wireline Access Gateway Function)

FIG. 5 shows the 5G system structure of a non-roaming case using a reference point representation that shows how various network functions interact with each other.

In FIG. 5, UDSF, NEF and NRF are not described for clarity of the point-to-point diagram. However, all network functions shown may interact with UDSF, UDR, NEF and NRF as needed.

For clarity, the connection between the UDR and other NFs (e.g., PCFs) is not shown in FIG. 5. For clarity, the connection between NWDAF and other NFs (e.g. PCFs) is not shown in FIG. 5.

The 5G system architecture includes the following reference points.
 N1: the reference point between the UE and the AMF.
 N2: reference point between (R)AN and AMF.
 N3: Reference point between (R)AN and UPF.
 N4: reference point between SMF and UPF.
 N6: Reference point between UPF and data network.
 N9: reference point between two UPFs.
The following reference points show the interactions that exist between NF services in NF.
 N5: Reference point between PCF and AF.
 N7: reference point between SMF and PCF.
 N8: reference point between UDM and AMF.
 N10: reference point between UDM and SMF.
 N11: reference point between AMF and SMF.
 N12: reference point between AMF and AUSF.
 N13: reference point between UDM and AUSF.
 N14: reference point between two AMFs.
 N15: Reference point between PCF and AMF in case of non-roaming scenario, and reference point between PCF and AMF of visited network in case of roaming scenario.
 N16: reference point between two SMFs (in case of roaming, between the SMF of the visited network and the SMF of the home network)
 N22: reference point between AMF and NSSF.
In some cases, it may be necessary to connect two NFs to each other to service the UE.

5GC (5G Core) may include various components, and in FIG. 6, AMF (Access and Mobility Management Function) 410, SMF (Session Management Function) 420, and PCF (Policy Control) corresponding to some of them Function) 430, UPF (User Plane Function) 440, AF (Application Function) 450, UDM (Unified Data Management) 460, and N3IWF (Non-3GPP InterWorking Function) 490.

The UE 100 is connected to a data network via the UPF 440 through a Next Generation Radio Access Network (NG-RAN) including the gNB 20.

The UE 100 may receive a data service through untrusted non-3rd Generation Partnership Project (non-3GPP) access, for example, a wireless local area network (WLAN). To connect the non-3GPP access to the core network, an N3IWF 490 may be deployed.

<Network Slice>

Hereinafter, network slicing to be introduced in next-generation mobile communication will be described.

Next-generation mobile communication introduces the concept of network slicing in order to provide various services through one network. Here, network slicing is a combination of network nodes having functions necessary to provide a specific service. A network node constituting a slice instance may be a hardware independent node or a logically independent node.

Each slice instance can be composed of a combination of all nodes necessary to configure the entire network. In this case, one slice instance may provide a service to the UE alone.

Alternatively, a slice instance may be composed of a combination of some of the nodes constituting the network. In this case, the slice instance may provide a service to the UE in conjunction with other existing network nodes without providing a service to the UE alone. In addition, a plurality of slice instances may provide services to the UE in association with each other.

A slice instance differs from a dedicated core network in that all network nodes including a core network (CN) node and a RAN can be separated. In addition, a slice instance is different from a dedicated core network in that network nodes can be logically separated.

Figure 7:
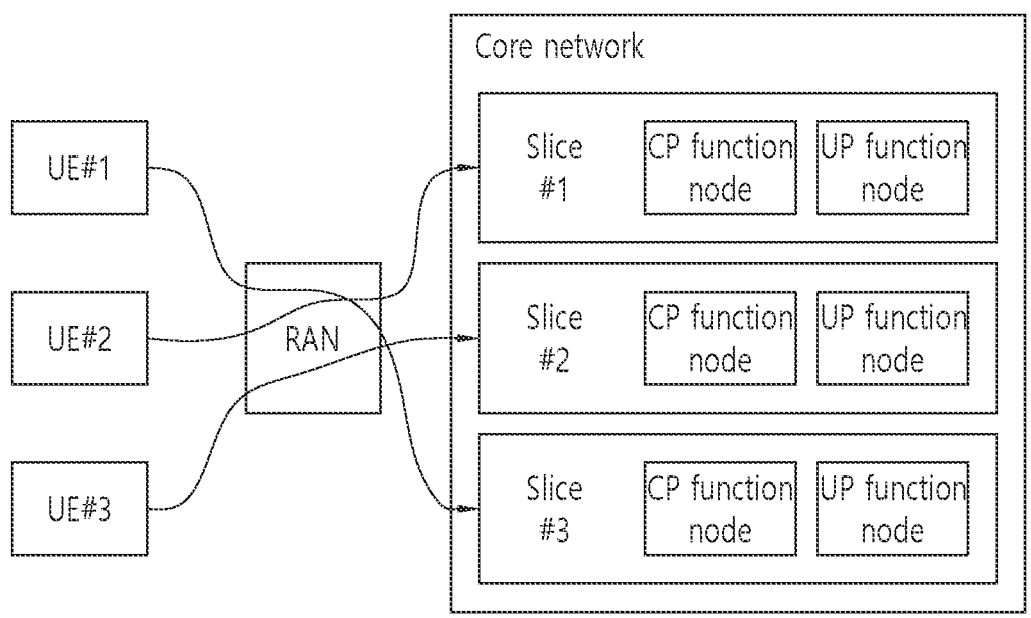
FIG. 7 is an exemplary diagram illustrating an example of an architecture for implementing the concept of network slicing.

FIG. 7 is an exemplary diagram illustrating an example of an architecture for implementing the concept of network slicing.

As can be seen with reference to FIG. 7, the core network CN may be divided into several slice instances. Each slice instance may include one or more among a CP function node and a UP function node.

Each UE may use a network slice instance suitable for its own service through an access network (AN).

FIG. 7, each slice instance may share one or more of a CP function node and a UP function node with another slice instance. This will be described with reference to FIG. 8 as follows.

Figure 8:
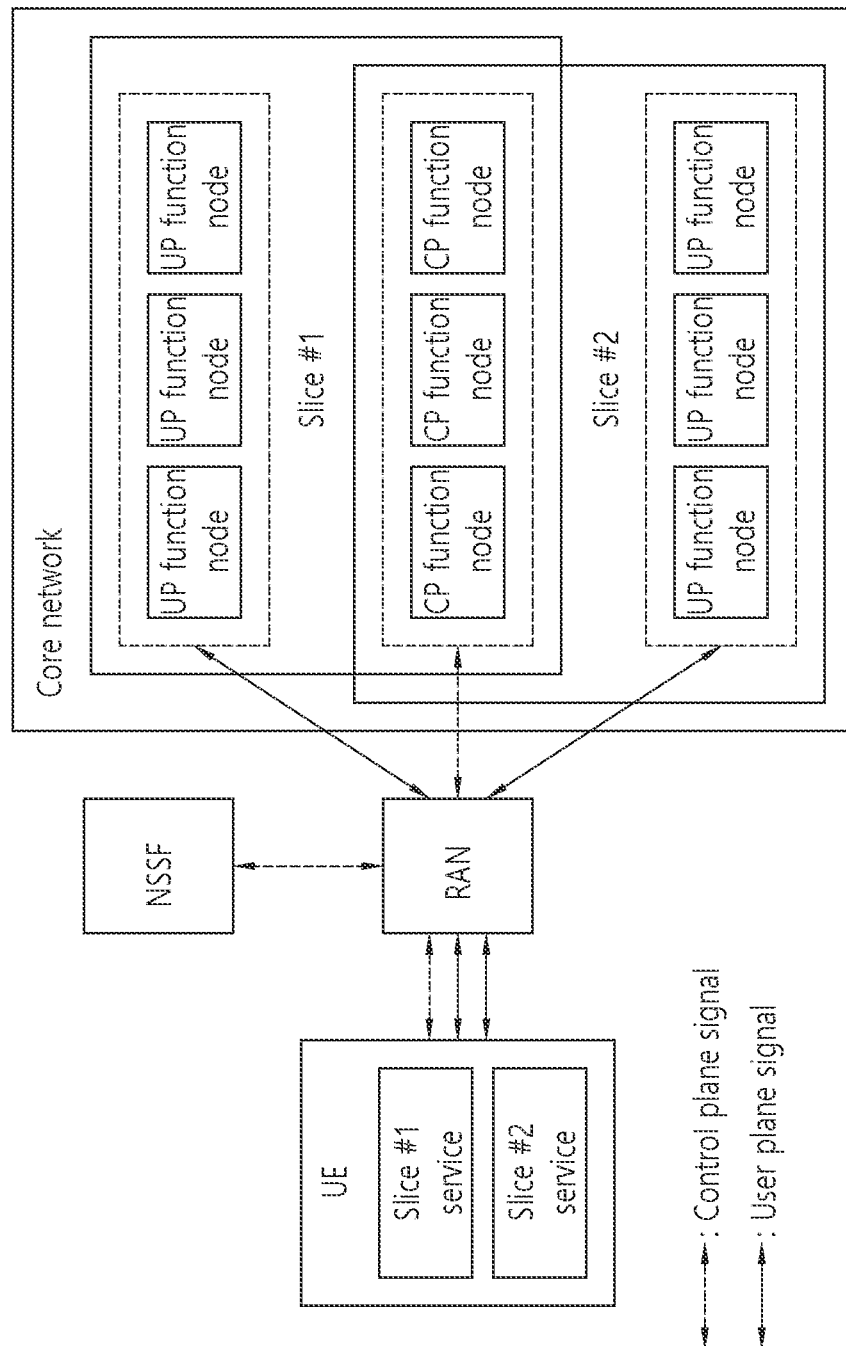
FIG. 8 is an exemplary diagram illustrating another example of an architecture for implementing the concept of network slicing.

FIG. 8 is an exemplary diagram illustrating another example of an architecture for implementing the concept of network slicing.

Referring to FIG. 8, a plurality of UP functional nodes are clustered, and similarly, a plurality of CP functional nodes are also clustered.

And, referring to FIG. 6, slice instance #1 (or referred to as instance #1) in the core network includes the first cluster of UP functional nodes. And, the slice instance #1 shares a cluster of CP functional nodes with slice #2 (or called instance #2). The slice instance #2 includes a second cluster of UP functional nodes.

The illustrated Network Slice Selection Function (NSSF) selects a slice (or instance) that can accommodate the service of the UE.

The illustrated UE may use service #1 through the slice instance #1 selected by the NSSF, and may use service #2 through the slice instance #2 selected by the NSSF.

<Problems to be Solved in the Disclosure of the Present Specification>

In a mobile communication system to which network slicing is applied, when a terminal cannot be served due to various issues (e.g., network slice overload or limit on the number of serving terminals/number of PDU sessions according to network slice management policy) in a specific network slice, the network delivers a rejection message to the terminal and a back-off timer for limiting re-request. With the distribution of back-off time, it is possible to use a technique to distribute requests of terminals from the point of view of the entire network. However, from the standpoint of the terminal or the service received by the terminal, flexibility in providing various 5G services may be reduced due to lack of consideration for will and preference of the terminal's requested service or the terminal users.

Currently, control over the management of various types of sessions existing in 5G is not considered. In addition, control for management of sessions generated in the EPC but likely to be converted to 5G sessions by interworking procedures in the future is not considered. In such various situations, an operator limit control policy for managing the number of sessions of a network slice is required, and such a policy needs to be applied flexibly.

<Disclosure of this Specification>

Disclosures described later in this specification may be implemented in one or more combinations (e.g., a combination including at least one of the contents described below). Each of the drawings represents an embodiment of each disclosure, but the embodiments of the drawings may be implemented in combination with each other.

Description of the method proposed in the disclosure of this specification may be composed of a combination of one or more operations/configurations/steps described below. The following methods described below may be performed or used in combination or complementary.

The following drawings are made to explain a specific example of the present specification. Since the names of specific devices or names of specific signals/messages/fields described in the drawings are provided as examples, the technical features of the present specification are not limited to the specific names used in the drawings below.

A network control node (e.g., session management function (SMF)) may check the limit control policy defined by the operator. The network control node may determine whether to send a limit control request message to a limit control network node (e.g., a network function (NF)). The network control node may include information about a specially managed PDU session in the limit control request message. The limit control request message may include information indicating what type of session the network control node manages. The limit control request message may include information on an information network slice index management node (e.g., NWDAF, NSSF or a new network node including a corresponding function) that can affect the increase or decrease of the limit session number.

The limit control network node (ex. NF) may check the limit control policy defined by the operator. The limit control network node may check the information received from the SMF. A limit control network node may perform limit control. The limit control network node may deliver the result value of limit control to the SMF. The result value may directly or implicitly include the result value and reason for the specially managed session in the message to be delivered.

The disclosure of this specification may provide operators with the flexibility to control the allocation of the number of PDU sessions per network slice when there is a specific PDU session that uses more network resources than a general PDU session in terms of network resource usage.

Operators may set and configure policy for quotas in the SMF and/or NF that control quotas (specifically, the number of PDU sessions per session). For operator quota control, the following PDU sessions in 5GS may be considered.

(a) PDU sessions using ULCL;
(b) PDU sessions using multiple homing PDUs;
(c) Multi-Access (MA) PDU sessions, etc.

When this kind of a PDU session is established, the operator may configure the counter to increment by a specific value (e.g., one or two). When this kind of a PDU session is released, the operator may configure the counter to decrement by a specific value (e.g., 1 or 2). When a PDU session of this kind is modified (e.g., adding/removing ULCL or BP, adding/removing one access to MA PDU, etc.), the operator may set the counter to a specific value (e.g. one or two) or may maintain the counter without incrementing/decreasing to the same value. For quota control for each operator, the PDN connection established in the EPC associated with S-NSSAI (Single Network Slice Selection Assistance Information) for interworking between EPC and 5GC may be considered. When this kind of PDN connection is established, the operator may configure it to increment the counter by a certain value (e.g. 1) or may maintain the counter at the same value without incrementing. When this kind of PDN connection is disconnected, the operator may configure the counter to decrement by a certain value (e.g. 1) or may maintain the counter at the same value without incrementing it. When this kind of PDN connection is delivered to the PDU session through the interworking procedure, the operator may configure the counter to increment by a specific value (e.g., 1) or may maintain the counter at the same value without increasing.

Figure 9:
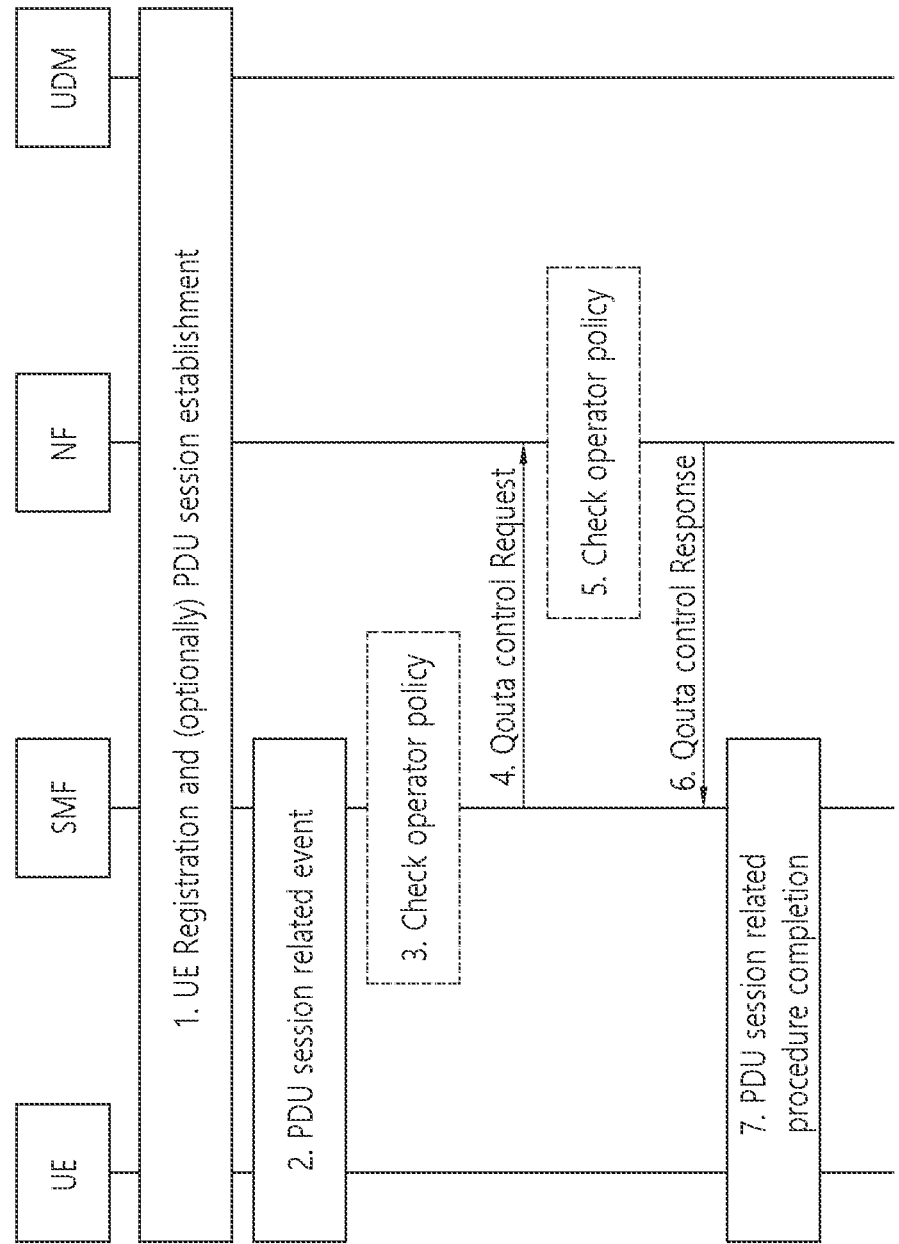
FIG. 9 shows a first example of the disclosure of this specification.

FIG. 9 shows a first example of the disclosure of this specification.
1. A terminal may be registered in the network. At this time, one or some PDU session (s) may be selectively established.
2. PDU session-related procedures may be triggered. And the SMF may recognize that the PDU session-related procedure is triggered.
3. An operator policy related to quota control for a PDU session in a specific network slice may be configured in the SMF. If an operator policy related to quota control for a PDU session in a specific network slice is configured in the SMF, the SMF may determine whether to send a quota control request to the NF by checking the operator policy. The NF may be a network node that controls the allocation of the number of PDU sessions per network slice.
4. The SMF may send a quota control request to the NF that controls the quota for the number of PDU sessions per network slice. The SMF may include information indicating a specific PDU session in the quota control request message.
5. If an operator policy for quota control for a PDU session in a specific network slice is configured in the NF, the NF may determine a method to apply to a specific PDU session by checking the operator policy.
6. The NF may send a response to the quota control request to the SMF.
7. The remaining steps of the PDU session-related procedures may be performed according to the corresponding procedure.

NF may be configured for quota control for a PDU session in a specific network slice and may determine an application method.

Figure 10:
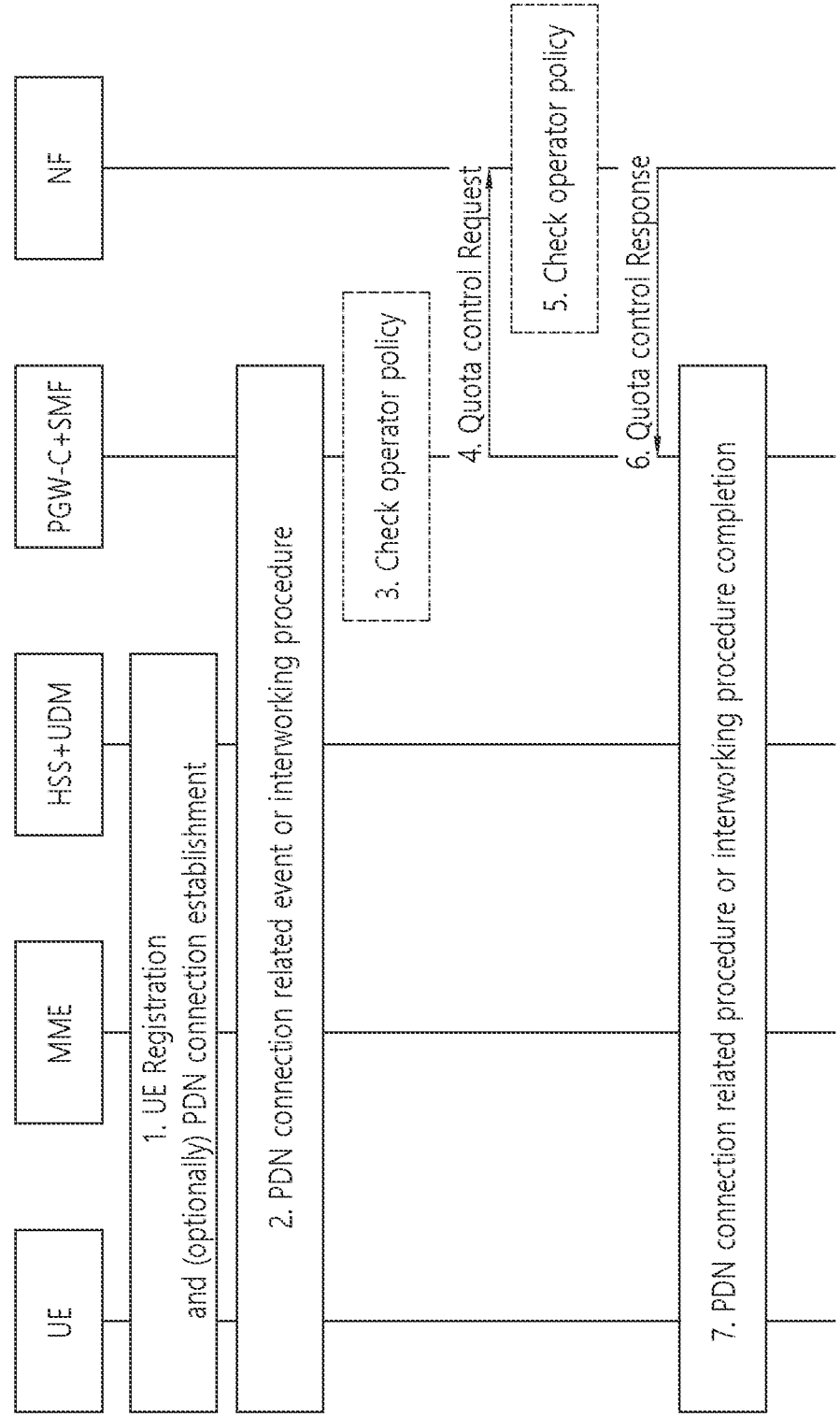
FIG. 10 shows a second example of the disclosure of this specification.

FIG. 10 shows a second example of the disclosure of this specification.

The specification may provide a quota control procedure considering interworking with Evolved Packet Core (EPC).

PGW-C+SMF may recognize PDN connection related procedures, in particular PDN connection related to S-NSSAI for interworking or that interworking from EPC to 5GC are invoked. PGW-C+SMF is a combo node of PGW-C and SMF, and may play the role of SMF on the 5GC side and the role of control plane on the EPC side.
1. The terminal, MME (Mobility Management Entity) and HSS+UDM (Home Subscriber Server+User Data Management) may register the terminal to the network. At this time, one or some PDN connection(s) may be selectively established.
2. PDN connection-related procedures may be triggered. And PGW-C+SMF may recognize that the PDN connection-related procedure is triggered. At this time, PGW-C+SMF may recognize that the created session or the session transferred to interworking is a session related to 5GS. Sessions related to 5GS include PDN connections created in EPC and potentially converted to 5G sessions by interworking procedures in the future, and sessions created in 5GC.
3. An operator policy related to quota control for a PDU session in a specific network slice may be set in PGW-C+SMF. If an operator policy related to quota control for a PDU session in a specific network slice is set in PGW-C+SMF, PGW-C+SMF may check the operator policy to determine whether to send a quota control request to the NF. The NF may be a network node that controls the allocation of the number of PDN sessions in a specific network slice.

PGW-C+SMF may determine whether a specific session and a specific network slice require network slice access control based on operator policy.
4. PGW-C+SMF may send a quota control request to the NF controlling the quota for the number of PDU sessions in a specific network slice. In step 3, if it is determined that a specific session needs network slice access control, PGW-C+SMF may send a quota control request to the NF. PGW-C+SMF may include information indicating a specific PDU session (e.g., a PDN connection that may be converted to a 5G session by an interworking procedure) in the quota control request message.
5. If an operator policy for quota control for a PDU session in a specific network slice is set in the NF, the NF may determine a method to be applied to a specific PDN session by checking the operator policy. For example, if the number of currently created PDU sessions for a corresponding network slice exceeds a configured number, the NF may transmit a response to the SMF indicating that the number of PDU sessions in the specific network slice exceeds the quota.
6. The NF may send a response to the quota control request to the SMF.
7. The remaining steps of the PDN connection-related procedure or interworking procedure may be performed according to the corresponding procedure.

NF may be configured for quota control for a session in a specific network slice and may determine an application method. For example, if the number of PDN sessions in the specific network slice exceeds the quota, a procedure for sending a PDN connection rejection message to the terminal may be performed since the requested PDN connection cannot be established.

A specific example of steps 1-3 of FIG. 10 is as follows.
a. The UE may perform a registration procedure to access the EPC. In 14 step of attach procedures (FIG. 5.3.2.1-1 of section 5.3.2) implemented in section 5.3.2 of TS23.401 (3GPP TS 23.401 V16.7.0 (2020-07)), P-GW may decide whether or not to create a PDN connection. That is, the P-GW may check whether a corresponding PDN connection is a PDN connection for interworking based on subscriber information, PCC information, UE request information, and the like.
i) If the corresponding PDN connection is a PDN connection requiring no interworking, steps b-c are performed.
ii) If the corresponding PND connection is a PDN connection requiring interworking, step b is skipped and step c is performed. Because an event related to the PDN connection has already occurred during the attach procedure, step b is skipped. A PDN connection for interworking has been established, and an interworking procedure may be performed. During the handover procedure from ECS to 5GS, the P-GW+SMF may recognize the handover situation of the PDN connection requiring interworking. In this case, step b is skipped and step c is performed.

b. As a PDN connection-related event, a procedure for generating one more PDN connection requiring additional interworking may be performed. For example, an IMS PDN connection for voice call may be created through a dedicated bearer activation procedure. At this time, the P-GW-C+SMF may recognize that the corresponding session is a PDN connection requiring interworking based on subscriber information and information received from the PCRF in step.

c. P-GW-C+SMF may recognize PDN connection for interworking. The P-GW-C+SMF may determine whether to send a limit control request message to the NF after checking whether the PDN connection requires network slice access control according to a configured operator policy.

Through the aforementioned dedicated bearer activation procedure, an IMS PDN connection for voice call may be created.

Figure 11:
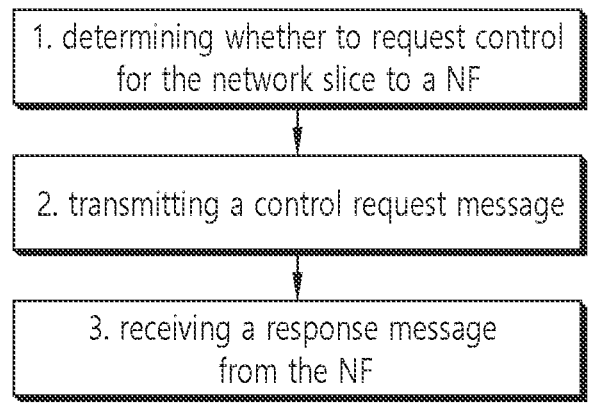
FIG. 11 shows a procedure of a network control node according to the disclosure of this specification.

FIG. 11 shows a procedure of a network control node according to the disclosure of this specification.

1. The network control node may check whether a session managed by the network control node is related to the interworking procedure. In addition, the network control node may check whether the network slice is a subject of control by checking the operator policy. Based on the result, The network control node may determine whether to request control for the network slice to a network function (NF). The network control node may be an SMF or a PGW-C+SMF combo node. An NF may be a node that manages session quotas of a network slice. The NF may check the operator policy for the maximum number of available PDU sessions per network slice.

A network slice may be related to a session managed by a network control node. The network slice is a subject of determining whether to request control.

2. When it is determined to request control of the network slice by step 1, the network control node may transmit a control request message to the NF.

The control request message may include information that the session is related to an interworking procedure.

The control request message may also include information about the network slice.

3. A response message to the control request message may be received from the NF.

The response message may include information about whether a session is available in the network slice.

Figure 12:
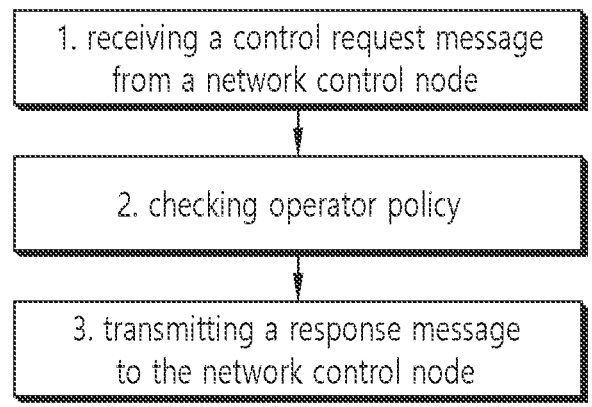
FIG. 12 shows the procedure of NF according to the disclosure of this specification.

FIG. 12 shows the procedure of NF according to the disclosure of this specification.

1. NF may receive a control request message from a network control node.

The control request message may include information that the session is related to an interworking procedure.

The control request message may also include information about the network slice.

2. The NF may check the operator policy regarding the network slice.

This operator policy may already be configured in the NF.

Operator policy may include information on the maximum number of sessions available in a network slice.

The NF may check the operator policy to check whether the corresponding session can use the corresponding network slice.

4. The NF may send a response message to the network control node.

The response message may include information about whether the corresponding session can use the corresponding network slice.

The present specification may have various effects.

For example, through the procedure disclosed in this specification, efficient communication may be provided by taking into account operator policy for managing the number of sessions of a network slice according to various situations.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method for performing communication, performed by a UE (User Equipment), comprising:
   transmitting, to an SMF (Session Management Function)+PGW-C (Packet Data Network Gateway-Control), an establishment request message of a PDU (Packet Data Unit) session,
   wherein the PDU session is related to a network slice,
   wherein the PDU session is related to an interworking procedure,
   wherein the SMF+PGW-C is configured with information indicating that the network slice is subject to NSAC (Network Slice Admission control);
   receiving, from the SMF, an establishment accept message of the PDU session, based on i) the SMF+PGW transmitting a control request message for the network slice to an NF (Network Function) and ii) the SMF+PGW receiving a response message from the NF,
   wherein the response message indicates that the network slice is available.

2. The method of claim 1,
   wherein the control request message includes information that the session is related to the interworking procedure.

3. The method of claim 1,
   wherein the control request message includes information on the network slice.

4. A UE (User Equipment) to perform communication, comprising:
   a transceiver; and
   a processor,
   wherein the processor performs operation comprising:

transmitting, to an SMF (Session Management Function)+PGW-C (Packet Data Network Gateway-Control), an establishment request message of a PDU (Packet Data Unit) session,
wherein the PDU session is related to a network slice,
wherein the PDU session is related to an interworking procedure,
wherein the SMF+PGW-C is configured with information indicating that the network slice is subject to NSAC (Network Slice Admission control);
receiving, from the SMF, an establishment accept message of the PDU session, based on i) the SMF+PGW transmitting a control request message for the network slice to an NF (Network Function) and ii) the SMF+PGW receiving a response message from the NF,
wherein the response message indicates that the network slice is available.

5. The UE of claim 4,
wherein the control request message includes information that the session is related to the interworking procedure.

6. The UE of claim 4,
wherein the control request message includes information on the network slice.

* * * * *